(No Model.)
W. H. BATE.
HANDLE OR PULL FOR WATER CLOSETS.
No. 347,313. Patented Aug. 17, 1886.
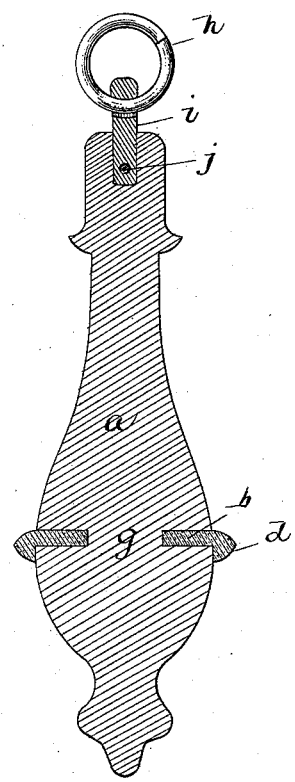
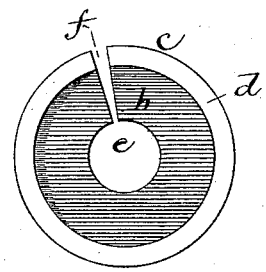
Witnesses:
H. Brown.
Geo. N. Finckel
Inventor:
W. H. Bate
by Knight, Brown & Crosby
Attys.

UNITED STATES PATENT OFFICE.

WALLACE H. BATE, OF MALDEN, MASSACHUSETTS.

HANDLE OR PULL FOR WATER-CLOSETS.

SPECIFICATION forming part of Letters Patent No. 347,313, dated August 17, 1886.

Application filed June 1, 1886. Serial No. 203,769. (No model.)

*To all whom it may concern:*

Be it known that I, WALLACE H. BATE, of Malden, in the county of Middlesex and State of Massachusetts, have invented certain new and useful Improvements in Handles or Pulls for Water-Closets, of which the following is a specification.

This invention relates to handles or pulls for the valves of water-closets, tanks, &c.; and is an improvement on the handle or pull patented to me January 19, 1886, No. 334,412, the object being to simplify the construction and cheapen the cost of manufacture of the pull described and shown in said patent.

My invention consists in the improvements hereinafter fully described, so that those skilled in the art may be able to make and use the same, the invention being particularly pointed out in the claims hereto appended.

Of the accompanying drawings, accompanying and forming a part of this specification, Figure 1 represents a longitudinal section of my improved pull. Fig. 2 represents a plan view of the rubber ring or disk before attachment to the handle of the pull.

Similar letters of reference indicate similar parts in both figures.

In carrying out my invention I construct a handle, $a$, of any suitable form and material, preferably of wood, and at the point of largest circumference, or when the pull, when pendent from a chain or cord connected with the valve-lever, would be likely to strike against the walls, I form a groove in and around the handle of sufficient depth to admit the flat or body portion $b$ of the rubber ring $c$, so that the enlarged flange or head $d$, formed on the outer edge or margin of the ring, will extend beyond the circumference of the handle, forming a substantial cushion or buffer therearound.

As shown in Fig. 1, the handle $a$ is formed in a single piece; and to enable me to place and secure the ring $c$ in the groove I mold the former in the shape desired, and cut through one side thereof from the center, $e$, outward, as represented at $f$ in Fig. 2, and set the ring into the groove by separating the severed ends $f$ of the former and passing them into the latter, astride of the portion $g$ of the handle, forming the bottom of the groove. The ring is formed so as to fit closely in the groove, and when sprung or pressed therein in the manner stated it will be held in position by frictional contact with the upper and lower surfaces of the grooves; or, if desired, it may be secured in position when placed in the groove, as stated, by means of cement, or in any other suitable manner.

The ring $h$ or cord-attaching means may be secured to the end of the pull in any wellknown or convenient manner. In the present instance I have shown the ring as passing through and adapted to turn in a hole formed in the stud $i$, set in a hole formed in the upper end of the handle, and riveted to the latter, as shown at $j$. It is obvious, however, that the lower end of the stud $i$ may be screwthreaded, and screwed into the hole formed in the upper end of the handle, or secured thereto in any manner that mechanical skill may suggest.

As shown by my said patent, the handle of the pull has heretofore been constructed in two parts or sections connected by a rod and nuts, with the rubber disk clamped between said sections. By my present improvements the construction of the pull is greatly simplified, and its cost of manufacture materially lessened.

I have herein employed the term "set" as indicating the manner in which my ring is placed in the groove of the handle. By the term mentioned I would be understood as distinguishing between my manner of placing the said ring in its groove and the manner in which a ring would be inserted in a groove when sprung therein, as set forth in the patent first mentioned hereinafter.

I am aware that an elastic band has been sprung into a groove formed in the angle made by the junction of the sides and face of a "rose" in a shower-bath apparatus, as shown and described in the patent to Harry J. Bailey, No. 192,728, dated July 3, 1877, and that rubber rings have in a similar manner been sprung into grooves formed in the handles of watercloset pulls.

I am also aware that drawer-pulls have been constructed with elastic cushions formed as pins affixed in holes formed in the side of the pull, as shown in the patent to Pierpent, No. 111,243, January 24, 1871.

Having thus described the invention, I claim—

1. The combination, with the handle $a$, constructed in a single piece and grooved, substantially as hereinbefore set forth, of the severed ring $c$, having the flat portion $b$ and the beaded rim $d$, the flat portion $b$ being inserted and set in said groove and the beaded portion extending beyond the circumference of the handle, as set forth.

2. The combination of the handle $a$, constructed in a single piece and grooved, substantially as hereinbefore set forth, of the severed ring $c$, having the flat portion $b$ and rim $d$, the flat portion being inserted and set in the groove and the beaded portion extending beyond the circumference of the handle, the stud $i$, secured in the upper end of the handle, and the ring $h$, as set forth.

In testimony whereof I have signed my name to this specification, in the presence of two subscribing witnesses, this 26th day of May, 1886.

WALLACE H. BATE.

Witnesses:
ARTHUR W. CROSSLEY,
C. F. BROWN.